(12) United States Patent
Goodman et al.

(10) Patent No.: US 7,490,140 B2
(45) Date of Patent: Feb. 10, 2009

(54) PEER DATA TRANSFER ORCHESTRATION

(75) Inventors: Brian D. Goodman, New York, NY (US); John W. Rooney, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/128,100

(22) Filed: May 12, 2005

(65) Prior Publication Data

US 2006/0259573 A1    Nov. 16, 2006

(51) Int. Cl.
*G06F 15/16* (2006.01)
(52) U.S. Cl. .................................... 709/219
(58) Field of Classification Search ................ 709/203, 709/204, 217–219, 226, 227, 231, 238
See application file for complete search history.

(56) References Cited

U.S. PATENT DOCUMENTS

| | | | |
|---|---|---|---|
| 5,996,025 A | 11/1999 | Day et al. | |
| 6,510,553 B1 | 1/2003 | Hazra | |
| 6,801,947 B1 | 10/2004 | Li | |
| 2002/0099844 A1 | 7/2002 | Baumann et al. | |
| 2003/0078964 A1 | 4/2003 | Parrella, Sr., et al. | |
| 2003/0084280 A1 | 5/2003 | Bryan et al. | |
| 2003/0188019 A1* | 10/2003 | Wesley | 709/245 |
| 2003/0191811 A1 | 10/2003 | Hashem et al. | |
| 2003/0204602 A1 | 10/2003 | Hudson et al. | |
| 2003/0204605 A1 | 10/2003 | Hudson et al. | |
| 2003/0204613 A1 | 10/2003 | Hudson et al. | |
| 2003/0233464 A1 | 12/2003 | Wallpole et al. | |
| 2004/0057379 A1 | 3/2004 | Chen et al. | |
| 2004/0172476 A1 | 9/2004 | Chapweske | |
| 2006/0288408 A1* | 12/2006 | Wesinger et al. | 726/11 |
| 2007/0028133 A1* | 2/2007 | Izutsu et al. | 714/4 |

OTHER PUBLICATIONS

"Method for the Conversion of Multimedia Streams to Packet Streams", IBM Technical Disclosure Bulletin, vol. 37 No. 6A, Jun. 1994, pp. 95-97.

* cited by examiner

*Primary Examiner*—Jeffrey Pwu
*Assistant Examiner*—Scott M Sciacca
(74) *Attorney, Agent, or Firm*—Gibb & Rahman, LLC; Derek S. Jennings (57) ABSTRACT

A system, method, service, and program storage device implementing a method of transferring data, wherein the method comprises arranging a plurality of peer systems in a computer network; coupling at least one data server preferably comprises data to the plurality of peer systems, wherein the plurality of peer systems comprise a first peer system and at least one second peer system; the first peer system instructing the at least one second peer system to collaboratively transfer the data from the at least one data server to the first peer system; and the at least one second peer system transferring the data from the at least one data server to the first peer system. The plurality of peer systems is preferably grid enabled.

1 Claim, 6 Drawing Sheets

PEER DATA TRANSFER ORCHESTRATION

BACKGROUND

1. Field of the Invention

The embodiments of the invention generally relate to network computing, and, more particularly, to network-based data transferring systems.

2. Description of the Related Art

The transfer of data from one system to another is a fundamental aspect of network computing. With the advent of grid and localized orchestration of file distribution, the transfer of data from a first system to a second system (i.e., peer-to-peer data transfer) has increased considerably. Data transfer requests in a grid system are generally services performed by many systems.

However, there are generally two major problems with these approaches to data transfer. First, peers are bandwidth limited by the technology or configuration of their connection to the network. A peer is a computing system participating in a networked environment. Most peers are limited by a single connection to the network (e.g. ethernet port, wireless, etc.). A router and bridge that connects a peer to a larger network of peers often brokers their connection. Even if the peer happens to be a mainframe with multiple connections to multiple networks, there generally is a limitation to the amount of data that can be transferred to the peer. Specifically, each network connection can typically only sustain a maximum rate of transfer and this is true for network hubs, switches, and bridges.

Second, the existing systems typically address orchestration servers. Approaching the problem from a server side perspective optimizes the data transfer load from one server to many. This provides optimal load distribution and higher transfer rates for client peers receiving the data. However, clients typically have limitations on how much data they can pull down at any one time.

With the popular reinvigoration of grid technologies, the exploitation of segmented data transfer has become a focus in leveraging peer networks. The shortcomings of the conventional approaches generally include the finite data transfer resource of the requesting system.

Figure 1:
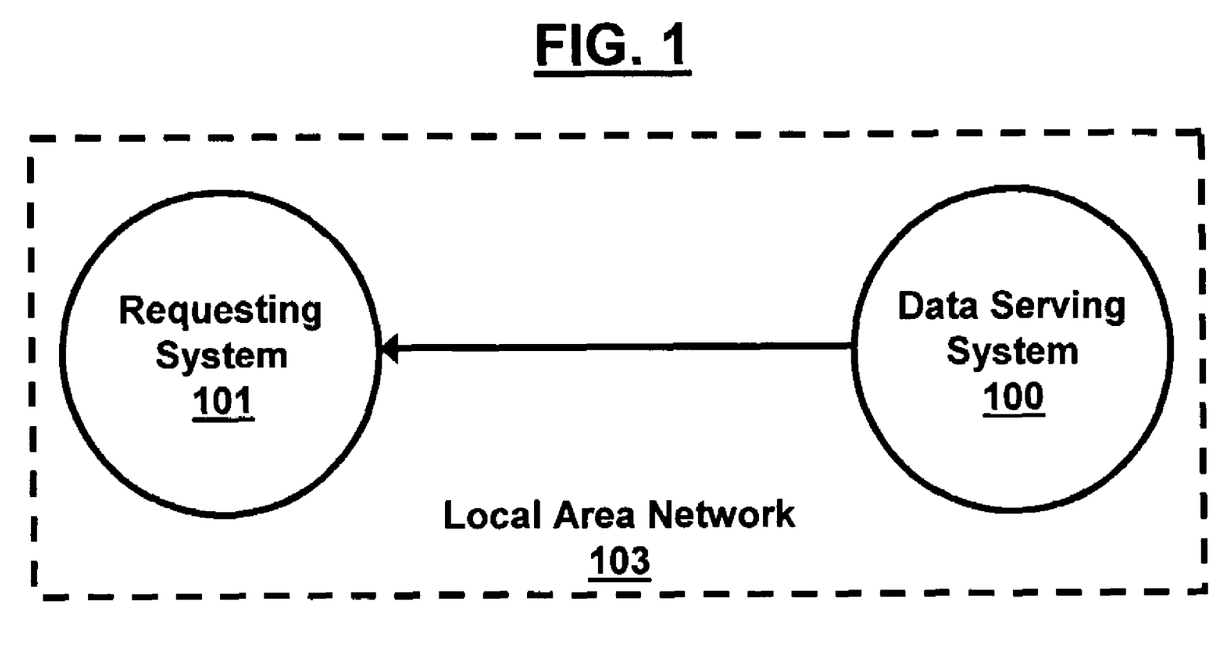
FIG. 1 illustrates a schematic diagram of a data transfer system.

FIG. 1 illustrates a basic data transfer scenario, where data is transferred from a data serving system (second system/client) 100 to a requesting system (first system) 101. In this data transfer scenario where, for example, the first system 101 requests a 1,000 MB file from the client 100, and the current client 100 is constrained at 1 MB/second. The file will transfer in approximately 17 minutes in a best-case scenario using a local area network (LAN) 103. Data transfer is also dependant on the ability of the second system 100 to correctly transfer the data, the location, etc. The data transfer will require almost all of the bandwidth available from the first system 101 in order to accomplish this task. The best-case scenario is the same as the single transfer and could even be worse due to overhead. Often the best case scenario is not possible and the initial transfer of 1,000 MB in 17 minutes is more likely to occur in 83 minutes (transferring at 0.2 MB/sec); an 80% increase in time.

Figure 2:
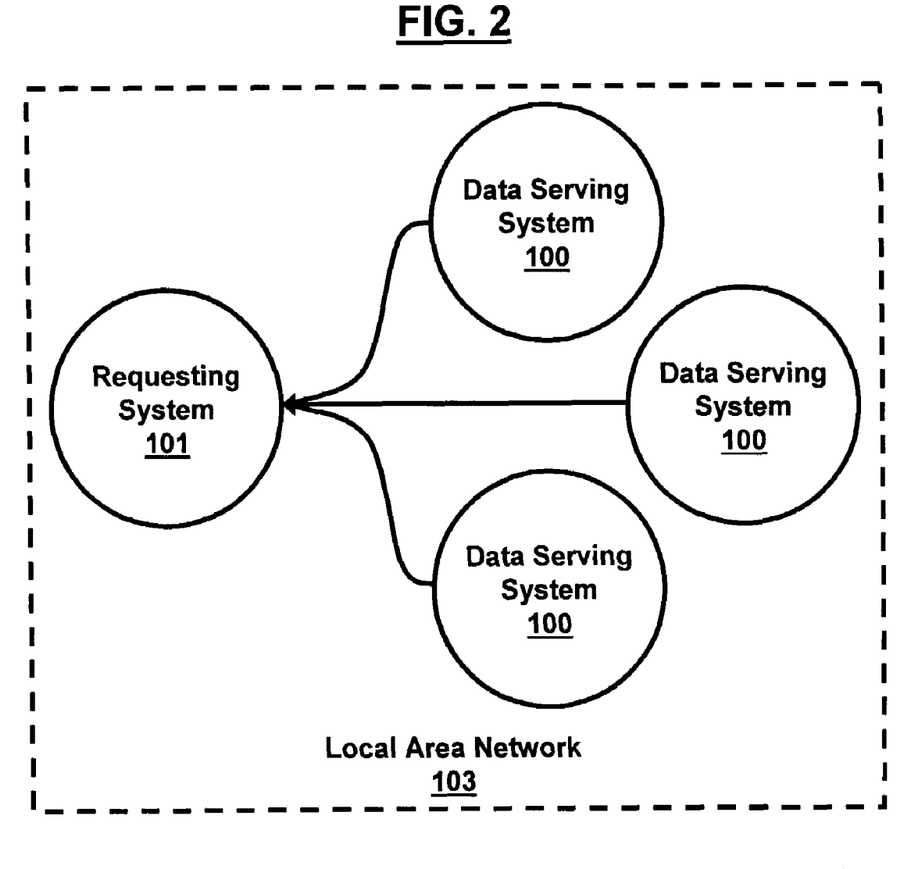
FIG. 2 illustrates a schematic diagram of a multi-system data transfer system.

The industry has generally established segmented data transfer as a popular way for increasing efficiency over traditional single threaded transfer as illustrated in FIG. 2. Segmented data transfers call upon multiple data sources 100 to service segments 101. The limitation to this approach is the fixed nature of the available bandwidth for a given server.

Figure 3:
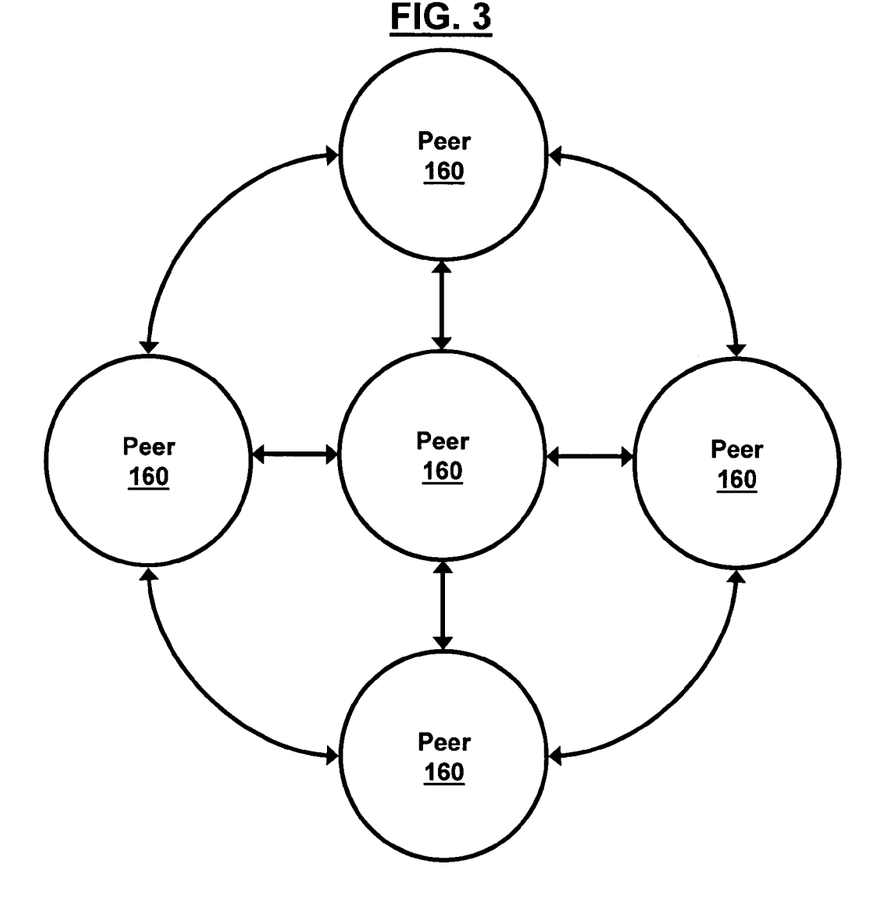
FIG. 3 illustrates a schematic diagram of a peer-to-peer network.

Peer-to-peer applications and architectures, such as the network illustrated in FIG. 3, offer a method of identifying data and transferring that data, often from multiple sources 160, to achieve the benefits of segmented file transfer. Again, this approach is generally limited by the physical configuration of the network bandwidth allocated to the requesting server 165. Accordingly, there remains a need for a novel peer-to-peer data transfer technique that overcomes the limitations of the conventional solutions.

SUMMARY

In view of the foregoing, an embodiment of the invention provides a data transfer system comprising a plurality of peer systems arranged in a computer network; and at least one data server comprising data and coupled to the plurality of peer systems, wherein the plurality of peer systems comprise a first peer system and at least one second peer system, wherein the first peer system is adapted to instruct the at least one second peer system to collaboratively transfer the data from the at least one data server to the first peer system, and wherein the at least one second peer system is adapted to transfer data from the at least one data server to the first peer system. The plurality of peer systems is preferably grid enabled. Moreover, the first peer system is preferably adapted to create a data transfer plan adapted to identify data resources and transfer bandwidth capabilities of each of the at least one second peer system, wherein the data transfer plan may comprise a uniform resource identifier (URI), a peer identifier, and byte ranges associated with each of the at least one second peer system. Furthermore, the first peer system may further be adapted to identify data to be transferred, identify the at least one second peer system capable of transferring portions of the data, and create a data transfer plan; and wherein the at least one second peer system is adapted to send the data transfer plan to the at least one data server and to provide a status message to the first peer system. Additionally, communication between the first peer system and the at least one second peer system may occur through web services. Also, the first peer system may be further adapted to reconstitute the data. The data transfer system further preferably comprises a peer directory adapted to connect the plurality of peer systems to one another.

Other embodiments of the invention provide a method of transferring data, a service of transferring data, and a program storage device readable by computer, tangibly embodying a program of instructions executable by the computer to perform a method of transferring data, wherein the method comprises arranging a plurality of peer systems in a computer network; coupling at least one data server preferably comprises data to the plurality of peer systems, wherein the plurality of peer systems comprise a first peer system and at least one second peer system; the first peer system instructing the at least one second peer system to collaboratively transfer the data from the at least one data server to the first peer system; and the at least one second peer system transferring the data from the at least one data server to the first peer system. The plurality of peer systems is preferably grid enabled. The method further preferably comprises the first peer system creating a data transfer plan and identifying data resources and transfer bandwidth capabilities of each of the at least one second peer system, wherein the data transfer plan may comprise a uniform resource identifier (URI), a peer identifier, and byte ranges associated with each of the at least one second peer system. Furthermore, the method further preferably comprises the first peer system identifying data to be transferred, identifying the at least one second peer system capable of transferring portions of the data, and creating a data transfer plan; and wherein the method further preferably comprises the at least one second peer system sending the data transfer plan to the at least one data server and providing a status message to the first peer system. Additionally, communication between the first peer system and the at least one second peer system may occur through web services. The method further preferably comprises the first peer system reconstituting the data and using a peer directory to connect the plurality of peer systems to one another. Preferably, the reconstitution of the data is performed by transferring the data using compression.

Another embodiment of the invention provides a computer system comprising a computer network; at least one data server comprising data and coupled to the computer network; a grid enabled first peer system coupled to the computer network; a plurality of grid enabled second peer systems coupled to the computer network; and a peer directory adapted to connect the first peer system and the plurality of second peer systems to one another, wherein the first peer system is adapted to instruct the at least one second peer system to collaboratively transfer the data from the at least one data server to the first peer system, wherein the plurality of second peer systems are adapted to transfer data from the at least one data server to the first peer system, and wherein the first peer system is further adapted to identify data to be transferred, identify the at least one second peer system capable of transferring portions of the data, and create a data transfer plan; and wherein the at least one second peer system is adapted to send the data transfer plan to the at least one data server and to provide a status message to the first peer system.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

Figure 4:
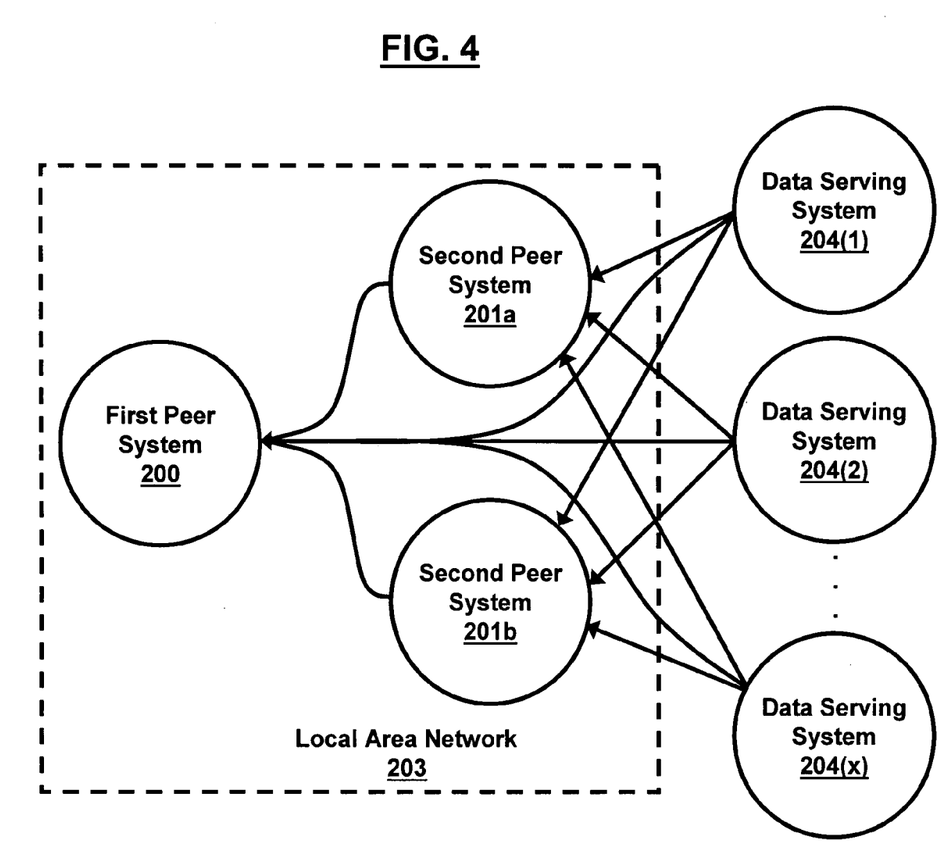
FIG. 4 illustrates a schematic diagram of a segmented data orchestration data transfer system according to an embodiment of the invention.
Figure 5:
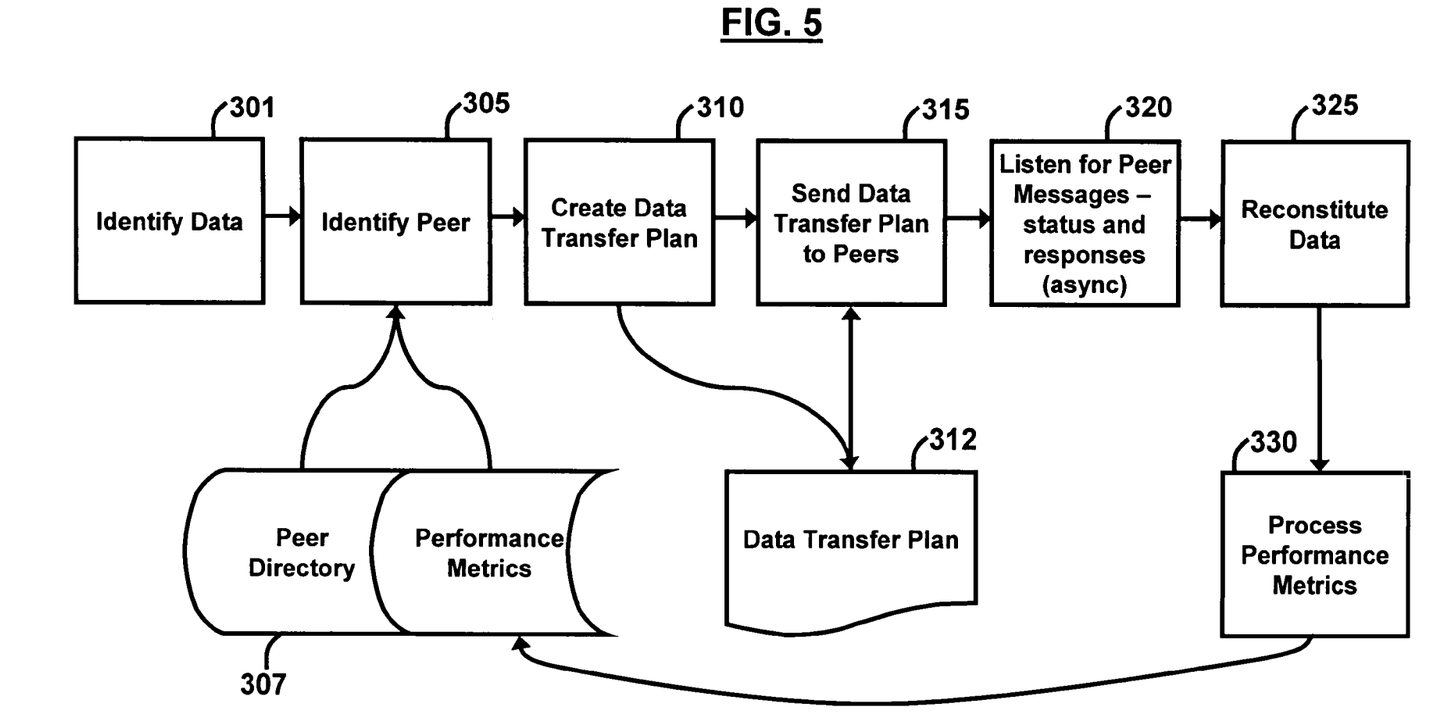
FIG. 5 illustrates a schematic diagram of a process flow of the segmented data orchestration data transfer system of FIG. 4 according to an embodiment of the invention.
Figure 6:
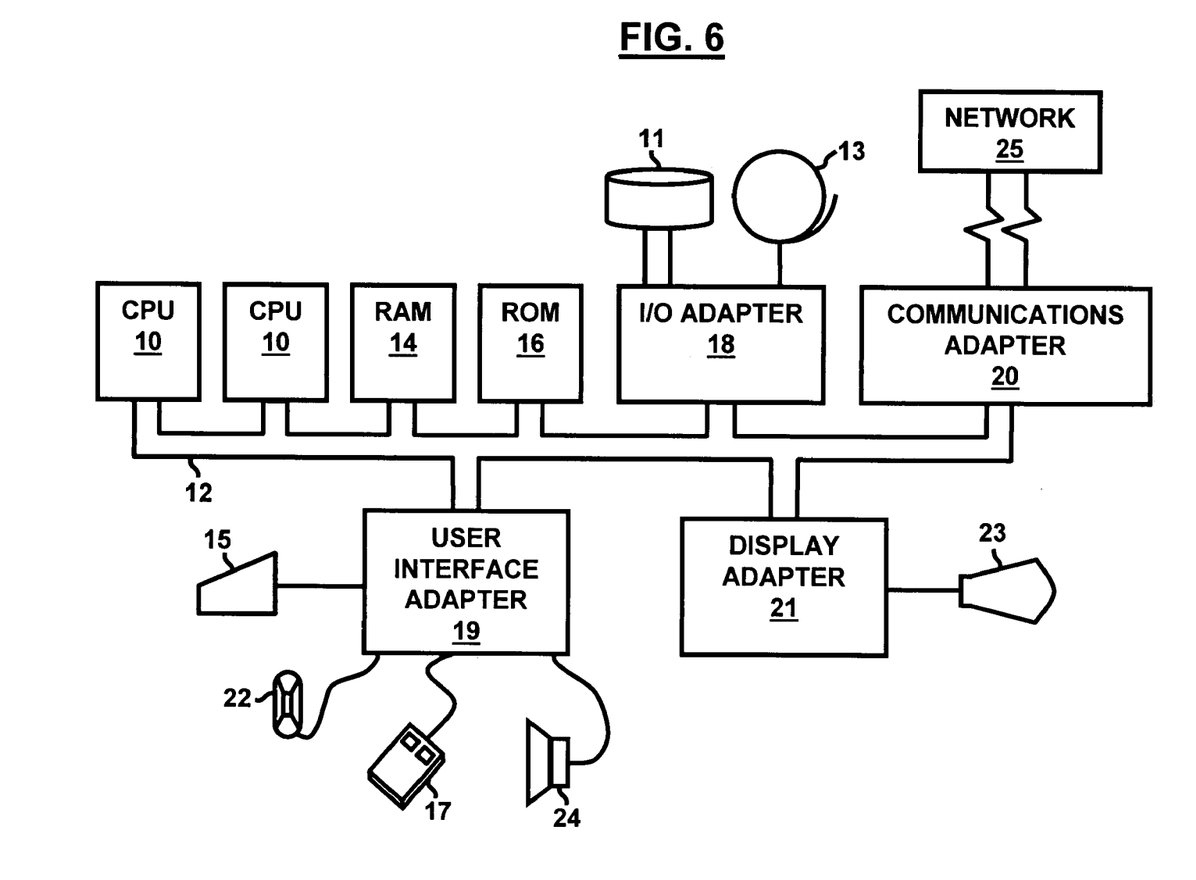
FIG. 6 illustrates a schematic diagram of a computer system according to an embodiment of the invention.

As mentioned, there remains a need for a novel peer-to-peer data transfer technique that overcomes the limitations of the conventional solutions. The embodiments of the invention achieve this by providing a peer-segmented data transfer orchestration allowing a single peer to coordinate the data transfer activity on behalf of one or more node peers, and specifically a system and method for enabling a first peer to orchestrate the data transfer behavior of a second peer to the benefit of the first peer. Referring now to the drawings, and more particularly to FIGS. 4 through 6 where similar reference characters denote corresponding features consistently throughout the figures, there are shown preferred embodiments of the invention.

With respect to the data transfer scenario in FIG. 4, the embodiments of the invention allow, in a LAN environment 203, a first peer system 200 to identify local peers (i.e., second peer system) 201$a$, 201$b$ capable of collaborative orchestrated segmented data transfer, and to send a series of instructions of which parts of, for example a 1,000 MB file to transfer to the first peer system 200. FIG. 4 illustrates only two second peer systems 201$a$, 201$b$ for ease of understanding. However, the embodiments of the invention may include an indefinite number of second peer systems. For example, if ten peers transfer a 100 MB portion of the file, then a peer 201$a$ can transfer those portions from its data serving systems (i.e., data servers) 204(1), 204(2) ... 204($x$) to complete the transaction. Leveraging ten peers to transfer 100 MB fragments transfer in parallel results in approximately 8 minutes (at 0.2 MB/sec) to transfer all 1,000 MB. By adding the transfer of the fragments locally at the initial 17 minutes (conventional technique), then the total time afforded by the embodiments of the invention is 25 minutes (8+17 minutes) versus 83 minutes (for the conventional scenario), which is a 70% increase in performance over the conventional approaches.

The embodiments of the invention provide a system and method for obtaining all the benefits of multi-sourced segmented data transfer while solving the traditional challenges of constrained bandwidth on a first peer system 200. The embodiments of the invention address peer segmented data transfer orchestration wherein local peers 201$a$, 201$b$ are instructed to participate in the process of data transfer as depicted in FIG. 4.

FIG. 5 illustrates a process in accordance with an embodiment of the invention, which includes the following steps, further described in greater detail below: data identification 301, peer identification 305, data transfer plan creation 310, instruction assignment 315, begin data transfer 320, listen for responses and potential status messages from peers 325, data reconstitution 330, and optionally metric and heuristic processing 335.

With reference to FIGS. 4 and 5, identifying the data (301) is synonymous with resolving the asset, which the primary peer 200 (of FIG. 4) is looking to download. This could be as simple as requesting information about the asset, minimally, that it exists and that it is of a certain size. In a grid based system, identifying the data might include connecting to a master asset server 204(1), for example, that manages the resources on the grid network and retrieving the list of grid nodes to pull the data from. The identification of data (301) involves using software running on a computer or device allowing for the identification (presence) of a uniform resource identifier (URI) to a desired asset. In the grid example, it involves at least one central server 204(1), for example, knowledgeable of all assets on the grid and which computers or nodes contain the assets. The identification of the resource could be performed by software running on a second system (not shown) capable of talking to the grid to get the list of servers 204(1), 204(2) . . . 204(x) from which the asset can be retrieved.

Peer identification (305) can be achieved in many ways. One way is to have a central server 204(1), for example, where all peers 201a, 201b register themselves. A peer directory 307 can respond with a list of peers 201a, 201b based on specific criteria such as location and performance. The identification and catalog of peers 201a, 201b in a network 203 may include basic web forms running on a primary peer 200 allowing users to add their IP address to a list downloadable through the web. Another example may include a central grid server 204(2), for example, wherein peer registration is embodied as nodes that happen to contain all or part of an asset of interest.

The creation (310) of a data transfer plan 312 involves breaking up a large file into smaller tasks and assigning each task to identified peers 201a, 201b. The smaller tasks are to transfer a subset of the larger file. The decision of which peer 201a, 201b receives which portion or how many portions (i.e., "chunks") is determined by the primary peer 200. This could be performed by force (e.g. divide equally amongst all peers 201a, 201b) or with some logic (e.g. the peer directory 307 shows a particular peer 201a, for example, as having four ethernet connections and bridging multiple networks so it is assigned five times the amount of work). The data transfer plan 312 is preferably a text file including eXtensible markup language (XML) detailing the instructions for other peers 201a, 201b to consume. Software is required on each peer system 201a, 201b to allow the primary peer 200 the ability to connect over a suitable network 203 or similar connection to other peers 201a, 201b.

After the data transfer plan 312 is sent (315) to each of the peers 201a, 201b, each peer 201a, for example, listens (325) for instructions from other peers 201b, for example, and responds as best as it is able to. At this point, metrics could be posted back to the peer directory 307 to ensure each peer 201a, 201b are not given too many tasks. Alternatively, the peer 201a, for example, can reject the work item and the primary peer 200 would be responsible for asking for more peers 201b, for example, or adjusting the workload. In a preferred implementation, peers 201a, for example, listen on a network socket for instructions from other peers 201b, for example. The process of listening on a network socket is well known to the art and requires suitable software on each peer 201a, 201b.

The primary peer 200 listens for the completion of the task. Upon completion, each peer 201a, 201b notifies the primary peer 200 of the task status, and the primary peer 200 begins the process of (presumably on the local or optimal network 200) reconstituting the data (320). Listening for the completion of the task requires software (possible embeddable in an appliance) on a port for other peers 201a, 201b notifying the primary peer 200 of job completion. Additionally, the primary peer 200 could maintain the socket connection for the full duration of the transaction. Alternatively, the peers 201a, 201b might leverage a publish/subscribe system for exchanging messages. Publish/subscribe style messaging allows for the efficient broadcast of messages from one to many, but can facilitate one to one messaging in straightforward generic way.

The final step is to report back the performance witnessed by the primary peer 200 to be added into the metrics and algorithms (330) the peer directory 307 uses in returning peer lists. Metric and heuristic processing (330) is an optional component of the embodiments of the invention intended to make the peer-to-peer system less arbitrary. Reporting back performance (330) requires software on the peer 201a, 201b and a central server (directory) 204(1), for example. The directory 204(1), for example, listens for feedback on peers 201a, 201b it knows about. In a preferred embodiment, the primary peer 200 connects over the network 203 to the directory servers 204(1), 204(2) . . . 204(x) using a Transmission Control Protocol/Internet Protocol (TCP/IP) and submits performance data in the form of an XML document describing the time of interaction, asset, peer and the associated performance metric.

The identification of peers (305) includes several solutions such as a community server, master directory, seeded list, and peer discovery. A community server approach is a server centric model where peers connect to a main server to accomplish peer awareness. Similarly, a master directory stores all the known peers, but may not provide services that the community server offers. Seeded lists are groups of random peer identifiers enabling a decentralized discovery of the network 203. Peer discovery is accomplished by several techniques, the simplest of which is pinging the subnet to discover peers 201a, 201b. Pinging occurs when a system 200, 201a, 201b is connected to a network 203 and sends a specific message requesting acknowledgement. When pinging a subnet, a primary system 200 is not addressing a specific system on the network 200. Rather, it is sending a message to any system 201a, 201b on the network 203 and looking for which systems respond. Various characteristics contribute to an overall weighting of each peer 201a, 201b. Examples include ping response time, average past task completion performance, or geography. These peer characteristics can optionally be provided through a common server or peer directory 307.

Client peers 201a, 201b can either be brokered through a common server 204(1), for example, or report back to a common server 204(1), for example, on the current characteristics of a specific data transfer. For example, if a primary peer 200 wants to transfer the file "data.zip" to a requesting user, the peers 201a, 201b that have that file might be known, but the best peers will typically be local peers. For example, if the peer is in the U.S. north east corridor, then transferring from China or Japan is less optimal that transferring from Toronto, Canada. In addition there may be local peers that do not have the bandwidth to help or are too busy, in which case other local peers are more advantageous. Identifying peers 201a, 201b with the exact file may be performed simply by file name, but generally requires other attributes to match such as a file size, timestamp, author, checksum, timestamp, MD5 Hash, or digital signature.

The creation and transfer (310) of a data transfer plan 312 to peers 201a, 201b identifies the resource in question and the portions required for transfer by each peer 201a, 201b. In one form, this data transfer plan 312 is embodied as a list with the URI, the peer identifier, and the byte ranges which that peer requests. Table 1 illustrates a sample data transfer plan in accordance with an embodiment of the invention.

TABLE 1

Sample data transfer plan http://www.server.com/a_big_file.zip, 40000
9.45.36.100,0,10000
9.45.36.101,10001,20000
9.45.36.102,20001,10000

The first line in Table 1 provides a URI to the data, identifying the protocol, server name, data name and resource size. The second, third, and fourth lines of Table 1 identify IP addresses of co-opted peers and the data range which that peer is requested to transfer. For example, the second line states that peer 9.45.36.100 requests 0, 10000 bytes of "a_big_file.zip" from www.server.com using a hypertext transfer protocol (HTTP) connection. Other transfer protocols are possible, such as File Transfer Protocol (FTP) or Network News Transfer Protocol (NNTP) etc. The numbers defining the range assigned to each peer could be specified in bytes, kilobytes, megabytes, etc. Additionally, the URI to the resource might point to a grid system or multiple host systems that could be used to transfer the data. The host systems to transfer from could be specified in the instructions node or as part of the nature of implementation as in the grid system where the grid system dictates which peers to transfer from.

Optionally, the data transfer plan 312 might take the form of a self-describing markup (i.e., in XML format) as shown in Table 2. The first node ("<resource . . . />") defines the resource and size of the total transfer. The second node (<instruction> . . . </instruction>) defines the instructions and includes the unique identifier and the specific instructions for that peer. In this case, the peer is instructed to make two transfers.

TABLE 2

Sample data transfer plan in XML format

```
<data-transfer-plan>
<resource uri="http://www.server.com/a_big_file.zip" size"40000"/>
<instruction>
    <peer uid="9 45.36 100"/>
    <transfer start="0" end="10000"/>
    <transfer start="30000" end="40000"/>
</instruction>
< instruction >
    <peer uid="9.45.36.101"/>
    <transfer start="10001" end="20000"/>
</instruction>
<instruction>
    <peer uid="9.45.36.102"/>
    <transfer start="20001" end="30000"/>
</instruction>
</data-transfer-plan>
```

The data transfer plan shown in Table 2 is written in XML. It includes similar content to that of the data transfer plan in Table 1. The parent node is the data-transfer-plan. It includes at least two child nodes, resource and instruction. The resource node describes the data the transfer plan refers to. It provides a URI to the data, identifying the protocol, server name, and data name. It also identifies the size of the data. The instruction node and stanza has several child nodes, peers, and at least one transfer node. The peer node has a property called a unique identifier (UID) which currently maps to the IP address of the target peer. The transfer node has two properties, start and end, identifying the data range which that peer is requested to transfer. In the case of this first instruction node, there are two transfer nodes indicating that peer 9.45.36.100 is being asked to transfer more than one segment of the associated data. Attributes and node values may be used interchangeably. For example: <peer> might have a child node <uid> instead of an attribute <peer uid="">. Additionally, the URI to the resource may point to a grid system or multiple host systems that might be used to transfer the data. The host systems to transfer from might be specified in the instructions node or as part of the nature of implementation as in the grid system where the grid system dictates which peers to transfer from. Other transfer protocols are possible, such as FTP or NNTP, etc. The numbers defining the range assigned to each peer could be specified in bytes, kilobytes, megabytes, etc.

Again with reference to FIGS. 4 and 5, call back notification from a peer 201a, 201b to the primary peer 200 offers an alternative to the data transfer plan 312. Additionally, data transfer plans 312 might not be transmitted in whole to each peer 201a, 201b. Individual peers 201a, 201b request the task to be performed and, when completed, ask for any other tasks to be performed. Transmitting the task list in whole offers opportunities for peers 201a, 201b to "collaborate" on accomplishing the task. For example, a peer system 201a, for example, might be transferring slowly but have more tasks. Another peer system 201b, for example, might be transferring quickly, but not have any further tasks. Given the complete data transfer plan 312, the primary peer system 200 can query the peer system 201a, 201b to establish a link and task transfer.

In another example, the peer 201a, 201b indicates to the primary (i.e., master) peer 200 that it is finished with the data transfer assigned. It can also ask for another segment of data to transfer. The primary peer 200 queries the current state of data transfer from the local peers 201a, 201b and reassigns task or portions of tasks. The connection from the primary peer 200 to the secondary peers 201a, 201b requires software running on each peer 201a, 201b capable of listening and responding to messages over the network 203. For example, a third peer (not shown) might have been asked to transfer 10000-30000 bytes but has only been able to transfer 20000. The primary peer 200 can assign 25000-30000 to an idle more advantageous peer 201a, for example. Upon completion, the primary peer system 200 can query for the final data transfer plan 312 to reconstitute the data by connecting to each peer 201a, 201b over the network 203. Alternatively, the primary peer 200 requests each part of a file from other peers 201a, 201b by connecting to each of the peers 201a, 201b over the network 203 using a suitable protocol supporting two way message transfer (send and respond). Other peer systems can respond with the data stream or the pointer to the data stream by reading the data as it is stored in memory (hard disk, RAM, network storage) and writing to a network port (not shown) where the primary peer 200 is listening.

As previously mentioned, an optional step is to process (330) performance data to aid in the optimal selection of peer systems 201a, 201b. This step may include submitting data to a central server 204(1), for example. Alternatively, the peer systems 201a, 201b could store the data locally on the immediate systems storage, RAM, hard-drive etc. Further algorithms may be run to determine weightings of each known peer system 201a, 201b. For example, data on average transfer speed for a given peer 201a, for example, may be captured. The peer 201a may decide through preprogrammed rules or through end user intervention or preferences to indicate that average transfer rate is important. The peers 201b, for example, with slow transfer rate are selected last for co-option.

Another additional step is for each peer 201a, 201b to process requests only by trusted peers (not shown). Trusted peers may be managed centrally through central server policies or by end-user interaction. Prompts to an end user that 'X' peer is requesting trust status is one method for building a list of trusted peers. The end user might say this time only or always trust 'X' peer. Additionally, communication between peers 200, 201a, 201b might be encrypted through well-known encryption techniques.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 6. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Enabling client side orchestration allows segmented data transfer to be multiplied over two or more systems moving the data transfer bottleneck to the total bandwidth capacity of the network and the capacity for the resource server to transmit the data. The resulting transfer is faster than a multi-segment transfer from a single system. The ability for peers to cooperate and transfer parts of the same asset leverages both server topologies and network topologies to utilize all available resources. Multiple servers 204(1), 204(2) . . . 204(x) are capable of responding to multiple requests for the same asset and different parts of the same asset. The peer network 203 provided by an embodiment of the invention is capable of requesting the same file or parts of files from different servers 204(1), 204(2) . . . 204(x). This utilizes software on each of the peers 201a, 201b and software on the servers 204(1), 204(2) . . . 204(x).

First, the software on the servers 204(1), 204(2) . . . 204(x) is required to simply return all or part of a requested asset. Second, the software on the peers 201a, 201b is required to both submit and receive instructions of which part or parts of an asset to transfer and then subsequently transfer those parts to the primary peer 200. A central server (not shown) may include software that keeps track of the peers 201a, 201b for a given network 203. Enabling peers 201a, 201b with the software allows for faster transfers as they are all cooperating to download the same asset from potentially multiple places, reducing the final transfer to a more local high performing transfer. The embodiments of the invention provide a system and method for obtaining all the benefits of multi-sourced segmented data transfer while solving the traditional challenges of constrained bandwidth on a primary peer 200. Accordingly, the embodiments of the invention addresses peer segmented data transfer orchestration wherein local peers 201a, 201b are instructed by a primary peer 200 to participate in the process of data transfer.

Generally, the embodiments of the invention provide a data transfer system and method comprising a plurality of peer systems 200, 201a, 201b arranged in a computer network 203 and at least one data server 204(1), 204(2) . . . 204(x) comprising data and coupled to the plurality of peer systems 200, 201a, 201b, wherein the plurality of peer systems comprise a first peer system 200 and at least one second peer system 201a, 201b, wherein the first peer system 200 is adapted to instruct the at least one second peer system 201a, 201b to collaboratively transfer the data from the at least one data server 204(1), 204(2) . . . 204(x) to the first peer system 200, and wherein the at least one second peer system 201a, 201b is adapted to transfer data from the at least one data server 204(1), 204(2) . . . 204(x) to the first peer system 200. Preferably, the plurality of peer systems 200, 201a, 201b is grid enabled. The data transfer system further comprises a peer directory 307 adapted to connect the plurality of peer systems 200, 201a, 201b to one another.

The first peer system 200 is adapted to create a data transfer plan 312 adapted to identify data resources and transfer bandwidth capabilities of each of the at least one second peer system 201a, 201b. Additionally, the data transfer plan 312 comprises a URI, a peer identifier, and byte ranges associated with each of the at least one second peer system 201a, 201b.

The first peer system 200 is further adapted to identify data to be transferred, identify the at least one second peer system 201a, 201b capable of transferring portions of the data, and create a data transfer plan 312. Moreover, the at least one second peer system 201a, 201b is adapted to send the data transfer plan 312 to the at least one data server 204(1), 204(2) ... 204(x) and to provide a status message to the first peer system 200. Preferably, the communication between the first peer system 200 and the at least one second peer system 201a, 201b occurs through web services. Moreover, the first peer system 200 is further adapted to reconstitute the data, wherein the reconstitution of the data is performed by transferring the data using compression.

The foregoing description of the specific embodiments will so fully reveal the general nature of the embodiments of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of orchestrating peer data transfer, said method comprising:

arranging a first peer system and a plurality of second peer systems in a computer local area network (LAN), said first peer system being a destination of said orchestrated peer data transfer;

coupling to each of said plurality of second peer systems, at least one data server that stores target data to be transferred to said first peer system, wherein said plurality of second peer systems is grid enabled, and wherein communication between said first peer system and said plurality of second peer systems occurs through web services;

using, by said first peer system, a peer directory to connect said first peer and said plurality of second peer systems to one another;

identifying, by said first peer system, data resources and transfer bandwidth capabilities of each of said plurality of second peer system systems;

creating, by said first peer system, an orchestrated peer data transfer plan, wherein said orchestrated peer data transfer plan comprises a uniform resource identifier (URI) to said target data, a peer identifier, and a byte range associated with each of said plurality of second peer system systems, wherein said byte range identifies a requested portion of said target data which each second peer system of the plurality of second peer systems is requested to transfer, and wherein said first peer system sends—said data transfer plan to each of said plurality of second peer systems and each of said plurality of second peer systems provides a status message to said first peer system;

upon receiving said data transfer plan, said plurality of second peer systems collaboratively retrieving the requested portion of said target data from said at least one data server;

transferring, by each of said plurality of second systems, the requested portion of said target data to said first peer system; and reconstituting, by said first peer system, said data transferred by said orchestrated peer data transfer plan.

* * * * *